US012105235B2

(12) United States Patent
Misulia et al.

(10) Patent No.: US 12,105,235 B2
(45) Date of Patent: Oct. 1, 2024

(54) TRIPLET ACOUSTIC RING ASSEMBLY, NESTED ARRAY, AND METHOD

(71) Applicant: Raytheon Company, Waltham, MA (US)

(72) Inventors: Joseph M. Misulia, Portsmouth, RI (US); Andrew D. Wilby, Portsmouth, RI (US)

(73) Assignee: Raytheon Company, Tewksbury, MA (US)

( * ) Notice: Subject to any disclaimer, the term of this patent is extended or adjusted under 35 U.S.C. 154(b) by 7 days.

(21) Appl. No.: 17/812,541

(22) Filed: Jul. 14, 2022

(65) Prior Publication Data
US 2024/0019597 A1    Jan. 18, 2024

(51) Int. Cl.
*G01V 1/18* (2006.01)
*G01V 1/38* (2006.01)

(52) U.S. Cl.
CPC ............ *G01V 1/186* (2013.01); *G01V 1/3843* (2013.01)

(58) Field of Classification Search
CPC .... G10K 11/006; G01V 1/186; G01V 1/3843; G01V 1/201
See application file for complete search history.

(56) References Cited

U.S. PATENT DOCUMENTS

| | | | | |
|---|---|---|---|---|
| 3,859,620 A | * | 1/1975 | Percy | G10K 11/008 367/13 |
| 4,637,490 A | * | 1/1987 | Oxner | G10K 11/008 181/175 |

(Continued)

FOREIGN PATENT DOCUMENTS

| | | | | |
|---|---|---|---|---|
| EP | 3339911 A1 | * | 6/2018 | ............ G01V 1/201 |
| WO | 2021178067 A1 | | 9/2021 | |
| WO | 2024015130 | | 1/2024 | |

OTHER PUBLICATIONS

International Search Report and Written Opinion issued for priority International Application No. PCT/US2023/019065, mailed Sep. 5, 2023.

(Continued)

*Primary Examiner* — Yuqing Xiao
*Assistant Examiner* — Christopher Richard Walker
(74) *Attorney, Agent, or Firm* — Schwegman Lundberg & Woessner, P.A.

(57) ABSTRACT

A ring assembly of an underwater acoustic sensor (hydrophone) system includes a ring that has brackets that mount the hydrophones evenly circumferentially spaced apart. The ring assembly may have three hydrophones mounted on the ring, with the hydrophones maintained in a triplet configuration. Multiple ring assemblies may be stacked in a nested array, with the hydrophones of adjacent stacked ring assemblies offset circumferentially, with each of the hydrophones overlapping multiple of the stacked rings, with the stacking accomplished such that the ring assemblies are in a helical array. Rings with non-acoustic sensors may be stacked with (and interspersed within) the stacked rings. The stacked array of ring assemblies (and non-acoustic sensor assemblies) may be stored in a canister that facilitates uniform and controlled descent and deployment of the assemblies, with ring assemblies and non-acoustic assemblies paying out sequentially from a float at the top of the array.

20 Claims, 5 Drawing Sheets

(56) References Cited

U.S. PATENT DOCUMENTS

| | | | |
|---|---|---|---|
| 4,641,290 A * | 2/1987 | Massa | G10K 11/006 |
| | | | 367/153 |
| 4,689,773 A | 8/1987 | Congdon et al. | |
| 5,091,892 A | 2/1992 | Secretan | |
| 5,164,548 A * | 11/1992 | Angehrn | H04N 7/185 |
| | | | 181/103 |
| 5,197,036 A * | 3/1993 | Buckingham | G10K 11/006 |
| | | | 367/4 |
| 5,412,622 A * | 5/1995 | Pauer | H04R 1/44 |
| | | | 367/136 |
| 6,400,645 B1 * | 6/2002 | Travor | G10K 11/006 |
| | | | 367/4 |
| 6,697,300 B1 | 2/2004 | Holt | |
| 7,382,687 B2 * | 6/2008 | Doolan | G01S 7/52004 |
| | | | 367/118 |
| 7,719,925 B2 | 5/2010 | Kitchin et al. | |
| 2011/0149679 A1 | 6/2011 | Baker et al. | |
| 2016/0327640 A1 | 11/2016 | Seite | |
| 2020/0361571 A1 * | 11/2020 | Prevel | B63B 22/003 |
| 2021/0302605 A1 | 9/2021 | Misulia et al. | |
| 2021/0375250 A1 | 12/2021 | Carlsten et al. | |

OTHER PUBLICATIONS

"International Application Serial No. PCT US2023 019065, Invitation to Pay Additional Fees mailed Jul. 14, 2023", 4 pgs.

* cited by examiner

TRIPLET ACOUSTIC RING ASSEMBLY, NESTED ARRAY, AND METHOD

FIELD

The disclosure is in the field of underwater acoustic (hydrophone) arrays.

BACKGROUND

Various applications may use sensor arrays. An exemplary sensor array includes a hydrophone array. A hydrophone array may be implemented in a sonobuoy that is dropped or ejected from an aircraft, ship, or a land vehicle. The array may be dropped into an environment for surveillance. For example, the sensor array may be dropped in the ocean for underwater acoustic research. A sonobuoy that houses a hydrophone array may be used in military applications, such as in anti-submarine warfare. Sonobuoys typically have a small size such that packing a hydrophone line array in the sonobuoy presents challenges.

Using classic sonar processing methods, a vertical and horizontal hydrophone array is required to obtain bearing and range of an undersea acoustic target. Arrays having a large aperture (long length) are required to detect sources that are low sound source level, and/or low frequency. Deployment of both a vertical and horizontal array is mechanically challenging and often power consuming.

SUMMARY

A triplet ring assembly includes three acoustic sensors or hydrophones circumferentially spaced around a ring.

A hydrophone array includes ring assemblies stacked together. The stacking may have the hydrophones in a helical configuration.

A deployable array includes ring assemblies of hydrophones that deploy sequentially from a cannister to create a cylindrical array.

According to an aspect of the disclosure, a hydrophone assembly includes: a ring; and hydrophones attached to the ring evenly spaced about a circumference of the ring.

According to an embodiment of any paragraph(s) of this summary, the ring includes ring segments that separate brackets that receive the hydrophones.

According to an embodiment of any paragraph(s) of this summary, the ring segments define gaps therebetween for receiving cables of the assembly that are coupled to respective of the hydrophones.

According to an embodiment of any paragraph(s) of this summary, the hydrophone assembly includes three hydrophones circumferentially spaced about the ring to form a triplet array.

According to an embodiment of any paragraph(s) of this summary, the ring is made of metal.

According to an embodiment of any paragraph(s) of this summary, the ring is made of plastic.

According to an embodiment of any paragraph(s) of this summary, the ring is additively manufactured.

According to an embodiment of any paragraph(s) of this summary, the ring is a single continuous unitary piece of material.

According to an embodiment of any paragraph(s) of this summary, the ring assembly is part of an array pack that includes additional ring assemblies operatively coupled together.

According to an embodiment of any paragraph(s) of this summary, all of the ring assemblies are substantially identical in configuration.

According to an embodiment of any paragraph(s) of this summary, rings of adjacent of the ring assemblies are in contact.

According to an embodiment of any paragraph(s) of this summary, the ring assemblies of the array pack are stored in a nested configuration prior deployment.

According to an embodiment of any paragraph(s) of this summary, cables extending between the ring assemblies are radially inward of rings of the ring assemblies when the ring assemblies are in the nested configuration.

According to an embodiment of any paragraph(s) of this summary, the cables are in a flood region of the array when the ring assemblies are in the nested configuration, with the flood region defined by the rings of the ring assemblies.

According to an embodiment of any paragraph(s) of this summary, the flood region is in fluid communication with gaps in the rings.

According to an embodiment of any paragraph(s) of this summary, adjacent of the ring assemblies are stacked with hydrophones of a first ring assembly of the adjacent ring assemblies radially overlapping a ring of a second ring assembly of the adjacent ring assemblies, and wherein the hydrophones of the first ring assembly are circumferentially offset from hydrophones of the second ring assembly.

According to an embodiment of any paragraph(s) of this summary, the ring assemblies are stacked in a helical array.

According to an embodiment of any paragraph(s) of this summary, the device further includes non-acoustic sensor assemblies between some adjacent pairs of the ring assemblies.

According to an embodiment of any paragraph(s) of this summary, the non-acoustic sensor assemblies each include one or more non-acoustic sensors.

According to an embodiment of any paragraph(s) of this summary, the one or more non-acoustic sensors include one or more of a pressure sensor, a temperature sensor, a salinity sensor, a position sensor, an orientation sensor, a roll sensor, a pitch sensor, and/or a heading sensor.

According to an embodiment of any paragraph(s) of this summary, the non-acoustic sensor assemblies each include non-acoustic sensor assembly ring to which the one or more non-acoustic sensors are attached.

According to an embodiment of any paragraph(s) of this summary, the non-acoustic sensor assemblies each include a centrally-located non-acoustic sensor of the one or more non-acoustic sensors, with the centrally-located non-acoustic sensor located along a central axis of the non-acoustic sensor assembly ring, at an intersection of arms extending radially inward from the non-acoustic sensor assembly ring.

According to an embodiment of any paragraph(s) of this summary, each of the non-acoustic sensor assemblies includes three of the arms extending radially inward from the non-acoustic sensor assembly ring.

According to an embodiment of any paragraph(s) of this summary, for each of the non-acoustic sensor assemblies the centrally-located non-acoustic sensor is the one or more non-acoustic sensors, without the non-acoustic sensor assembly including any other non-acoustic sensors.

According to an embodiment of any paragraph(s) of this summary, the ring assemblies are triplet ring assemblies, each with three acoustic sensors.

According to an embodiment of any paragraph(s) of this summary, the ring assemblies are coupled together by cables.

According to an embodiment of any paragraph(s) of this summary, the cables are at least 3 m (10 ft) in length, with the ring assemblies separated by at least 3 m (10 ft) when deployed.

According to an embodiment of any paragraph(s) of this summary, the device further includes a canister that the array pack is in prior to and partially during deployment.

According to an embodiment of any paragraph(s) of this summary, the device further includes a lower electronics unit that is coupled to the array pack.

According to an embodiment of any paragraph(s) of this summary, the device further includes an upper assembly that is coupled to the lower electronics unit by an array leader.

According to an embodiment of any paragraph(s) of this summary, the upper assembly is a float assembly capable of flotation.

According to an embodiment of any paragraph(s) of this summary, the lower electronics unit includes hardware and/or software, such as node cards, for recording, consolidating, manipulating, and/or interpreting data from the acoustic and/or non-acoustic sensors.

According to an embodiment of any paragraph(s) of this summary, the lower electronics unit includes a transmitter.

According to another aspect, a hydrophone array pack unit includes: an upper assembly; a cannister releasably mechanically coupled to the upper assembly; and an array pack in the cannister, wherein the array pack includes nested ring assemblies capable of deploying by separating vertically.

According to an embodiment of any paragraph(s) of this summary, the upper assembly includes an upper assembly electronics unit.

According to an embodiment of any paragraph(s) of this summary, the upper assembly includes a battery system.

According to an embodiment of any paragraph(s) of this summary, the upper assembly is a float assembly capable of flotation in water.

According to an embodiment of any paragraph(s) of this summary, the cannister and the array pack are heavier than water, and separate from the upper assembly when a mechanical coupling between the upper assembly and the cannister is released.

According to an embodiment of any paragraph(s) of this summary, when the mechanical coupling is released, the array pack remains tethered to the upper assembly by an array leader.

According to an embodiment of any paragraph(s) of this summary, separation of the cannister from the upper assembly autonomously causes deployment of the ring assemblies from the cannister, with the ring assemblies separated from one another vertically, with cables attaching the ring assemblies while the ring assemblies are separated.

According to an embodiment of any paragraph(s) of this summary, the ring assemblies are triplet ring assemblies, each with three acoustic sensors attached to a ring, with the acoustic sensors evenly circumferentially spaced around the ring.

According to yet another aspect, a method of deploying a hydrophone array, includes: mechanically releasing from a float assembly a cannister that contains an array pack of nested stack ring assemblies that each include a ring, and multiple hydrophones attached to the ring, circumferentially spaced around the ring; and deploying the ring assemblies from the cannister as the cannister moves away from the float assembly, with the ring assemblies remaining tethered to each other and to the float assembly during the deploying.

According to an embodiment of any paragraph(s) of this summary, the deploying includes the ring assemblies sequentially deploying from the cannister.

According to an embodiment of any paragraph(s) of this summary, the deploying includes the ring assemblies deploying from the cannister spaced apart from each other.

According to an embodiment of any paragraph(s) of this summary, the deploying includes the ring assemblies deploying from the cannister as cables connecting adjacent of the ring assemblies are payed out.

According to an embodiment of any paragraph(s) of this summary, the method further includes, after all of the ring assemblies have deployed from the cannister, separating the cannister from the ring assemblies and the float assembly, with the cannister no longer mechanically connected to the ring assemblies and the float assembly.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

A ring assembly of an underwater acoustic sensor (hydrophone) system includes a ring that has brackets that mount the hydrophones evenly circumferentially spaced apart. The ring assembly may have three hydrophones mounted on the ring, with the hydrophones maintained in a triplet configuration. The ring may have slots or gaps to allow passage of cables that are coupled to the hydrophones. Multiple ring assemblies may be stacked in a nested array, with the hydrophones of adjacent stacked ring assemblies offset circumferentially, with each of the hydrophones overlapping multiple of the stacked rings, with the stacking accomplished such that the ring assemblies are in a helical array. Rings with non-acoustic sensors may be stacked with (and interspersed within) the stacked rings. The stacked array of ring assemblies (and non-acoustic sensor assemblies) may be stored in a canister that facilitates uniform and controlled descent and deployment of the assemblies, with ring assemblies and non-acoustic assemblies paying out sequentially from a float at the top of the array. Following the deployment of the assemblies, the cannister (or can) will be shed from the bottom of the deployed array (structure). This maintains a slim cross section for the deployed array, which reduces the drag from cross flow.

The configuration allows for volumetric efficiency prior to deployment, and allows for reliable deployment of the numerous ring assemblies of the system autonomously, such as by employing gravity to separate the ring assemblies from each other. Further, the rings maintain a desirable configuration of the sensors (hydrophones) of individual nodes of the system, for example maintaining a desirable trip configuration of three evenly-circumferentially-spaced hydrophones about a ring.

Figure 1:
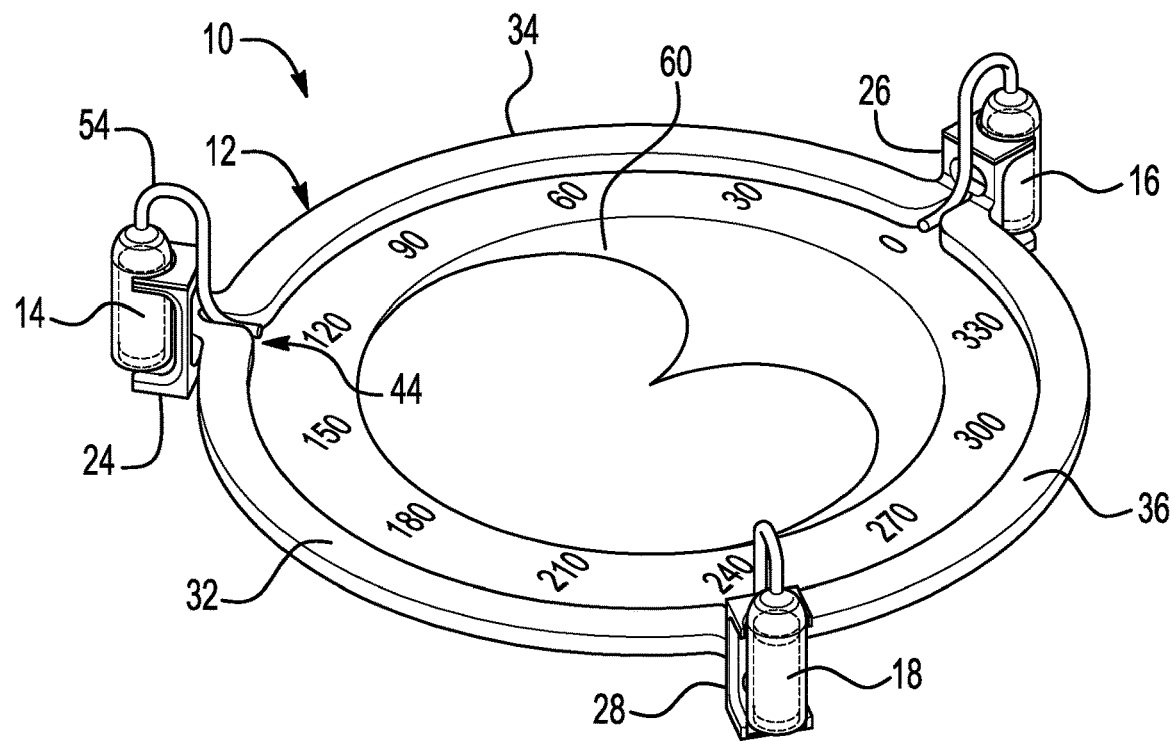
FIG. 1 is an oblique view of a triplet acoustic array ring assembly, according to an embodiment.
Figure 2:
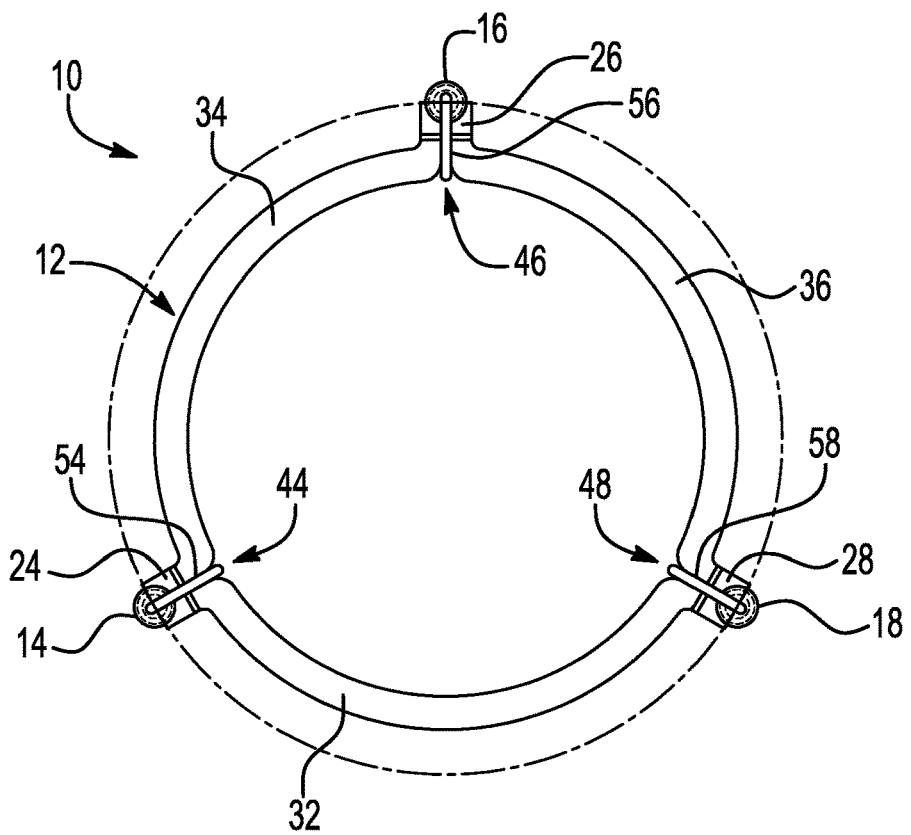
FIG. 2 is a plan view of the ring assembly of FIG. 1.

FIGS. 1 and 2 show a ring assembly 10 that includes a ring 12, and three acoustic sensors (hydrophones) 14, 16, and 18 that are evenly spaced around a circumference of the ring 12. The ring 12 include three bracket 24, 26, and 28 for receiving respective of the hydrophones 14, 16, and 18. The brackets 24, 26, and 28 are held in their spaced-apart triplet configuration by a series of ring segments 32, 34, and 36, which together account for the annular shape of the ring 12. The ring segments 32-36 leave gaps 44, 46, and 48 at the brackets 24-28, to allow passage of cables 54, 56, and 58, ends of which are shown in FIGS. 1 and 2.

The ring 12 may be made of any of a variety of suitable materials, for example metal, such as metal or plastic. The ring 12 may be a single continuous unitary piece of material, for example being additively manufactured.

The ring assembly 10 is shown with the three acoustic sensors 14-18 arranged in a triplet configuration. Such a configuration has a desirable sensor-to-sensor geometry maintained by the ring 12, for example allowing for formation of a steerable cardioid beam 60, providing directionally. This contrasts with single hydrophones, which are omnidirectional, providing no directionality when used alone.

The configuration of the triplet configuration produced by the ring assembly 10 may be adjusted for detection of sources at different source levels and frequencies. In addition, it may be possible to use a different number of acoustic sensors in a ring assembly.

Figure 3:
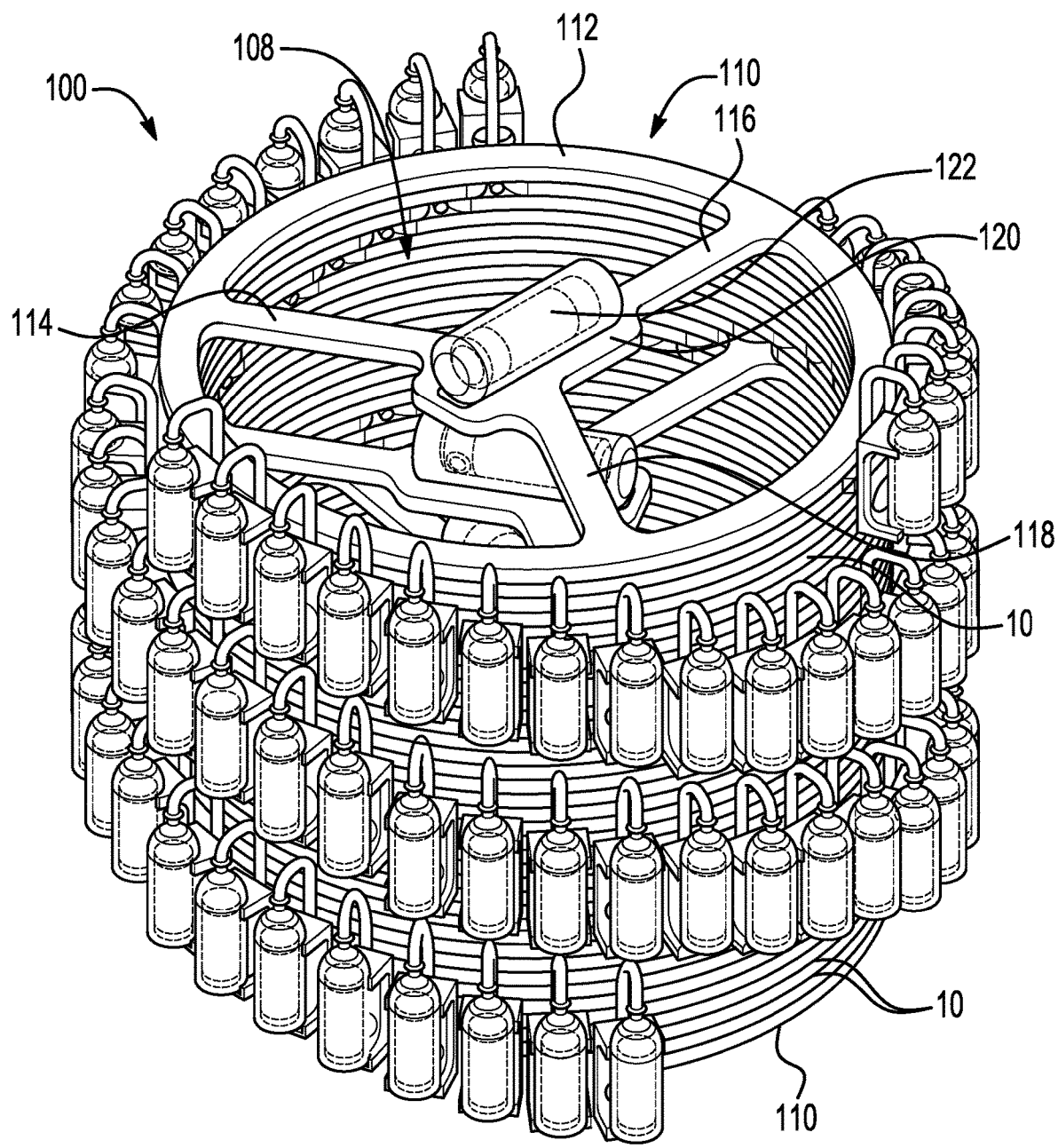
FIG. 3 is an oblique view of an array pack, according to an embodiment, that includes nested triplet acoustic ring assemblies.
Figure 4:
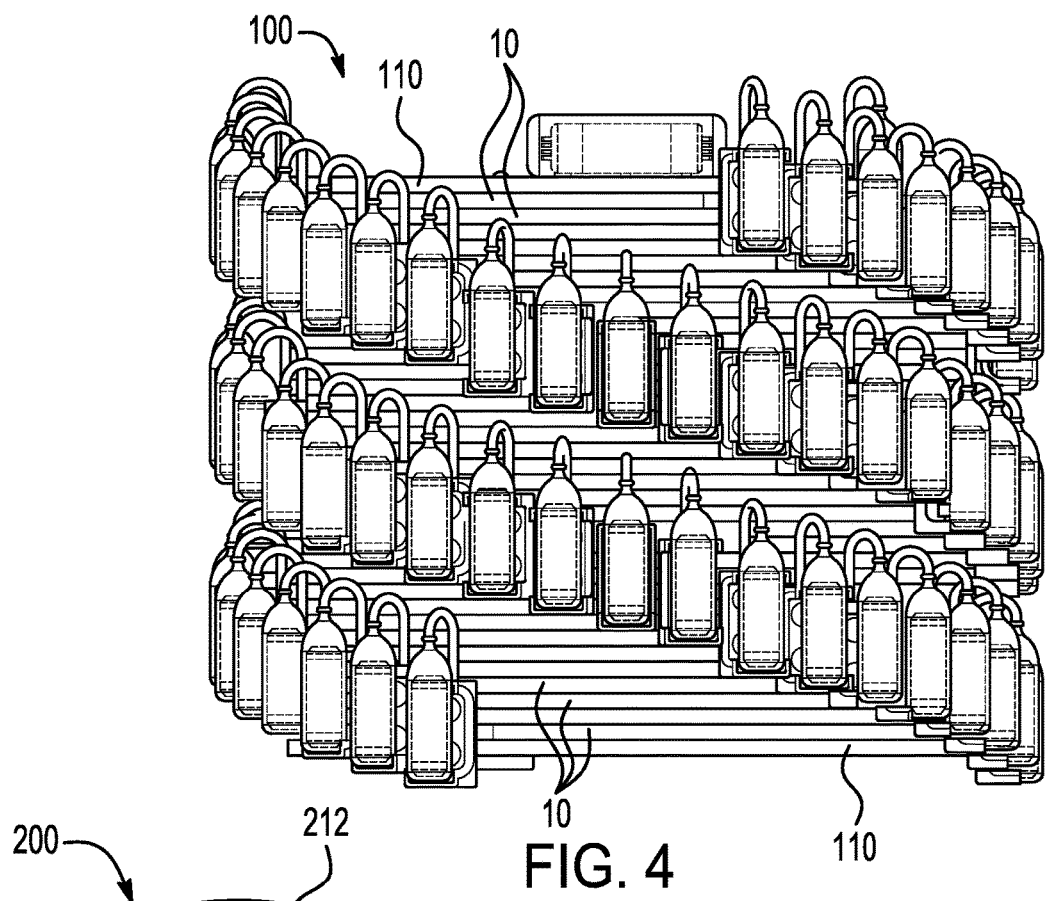
FIG. 4 is a side view of the array pack of FIG. 3.

With reference now to FIGS. 3 and 4, an array pack 100 of stacked ring assemblies 10 is shown. The ring assemblies 10 may all be substantially identical in configuration, meaning that they may have the same general layout, although they may not be exact duplicates of one another. The ring assemblies 10 of the array pack are stacked in a helical arrangement, with the acoustic sensors of adjacent ones of the ring assemblies successively offset in a circumferential direction 102. This allows the ring assemblies 10 to stack in a nested arrangement, with the acoustic sensors of individual ones of the ring assemblies 10 radially overlapping rings of adjacent (axially stacked) ring assemblies, without interference between the acoustic sensors of adjacent ones of the ring assemblies, due to the circumferential offset of the sensors in the helical arrangement.

Cables of the ring assemblies 10 are stored prior to deployment in an interior free flood region 108 of the array pack 100. The flood region 108 is a region that is flooded with water as part of the deployment process, such as before the ring assemblies 10 are deployed from the stacked, nested, helical arrangement illustrated in FIGS. 3 and 4. The flood region 108 is defined by interior portions of rings 12 (FIG. 1) of the ring assemblies 10. The flood region 108 is also in fluid communication with gaps 44-48 (FIG. 2) in the rings 12. This allows cables 54-58 (FIG. 2) to freely enter the flood region 108 through the gaps, allowing rings 12 of the ring assemblies to be stacked directly on top of one another without interfering with placement of the cables.

It should be appreciated that only small portions of the cables are shown in FIGS. 1-4. The cables in reality are long enough to extend between adjacent of the ring assemblies 10 when the system is fully deployed, as described further below. The cables may be packed within the flood region 108 in a suitable manner to allow for deployment without interfering with one another during deployment of the system.

Non-acoustic sensor assemblies 110 are also included in the array pack 100. The non-acoustic sensor assemblies 110 may be spaced intermittently within the ring assemblies 10, and may also be located at the top and/or bottom of the stack of nested assemblies 10 and 110.

In an embodiment, the non-acoustic sensor assemblies 110 each include a ring 112, with arms 114, 116, and 118 extending inward from the ring 112. The arms 114-118 intersect at a central mount 120, where a non-acoustic sensor (NAS) 122 is mounted. The ring 112, the arms 114-118, and the mount 120, may be made of any of a variety of suitable materials, such as metal or plastic. The NAS 122 may be a sensor for reporting any of a variety of sorts of information, such as pressure, temperature, salinity, roll, pitch, and/or heading.

In the illustrated embodiment there are thirty-two of the ring assemblies and five of the non-acoustic sensor assemblies 110. Non-acoustic sensor assemblies are located at the top and bottom of the stack, after every eight of the ring assemblies 10. It should be understood that this is just one example, and that many other arrangements are possible.

The array 100 may have a height of about 30-40 cm, to give one non-limiting example range. The array may have a diameter of about 40 cm. Many other sizes are possible.

The pack array 100 may be integrated into a host vehicle, for example a water vehicle such as a ship or underwater vehicle, or into a testing platform. The integrated array 100 may be in a cannister or can prior to and during deployment. Such a cannister or can is shown in FIGS. 5 and 6, and is described in connection with that embodiment.

Figure 5:
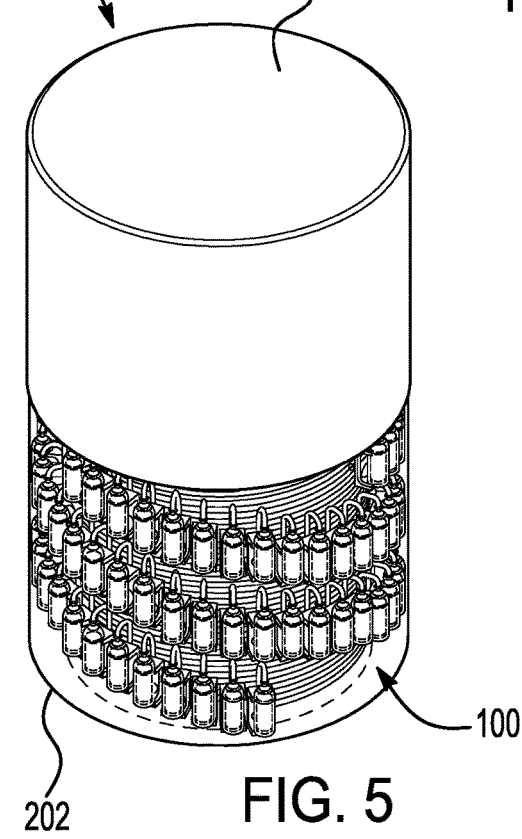
FIG. 5 is an oblique view of a deployment system, according to an embodiment, that includes the array pack of FIG. 3.
Figure 6:
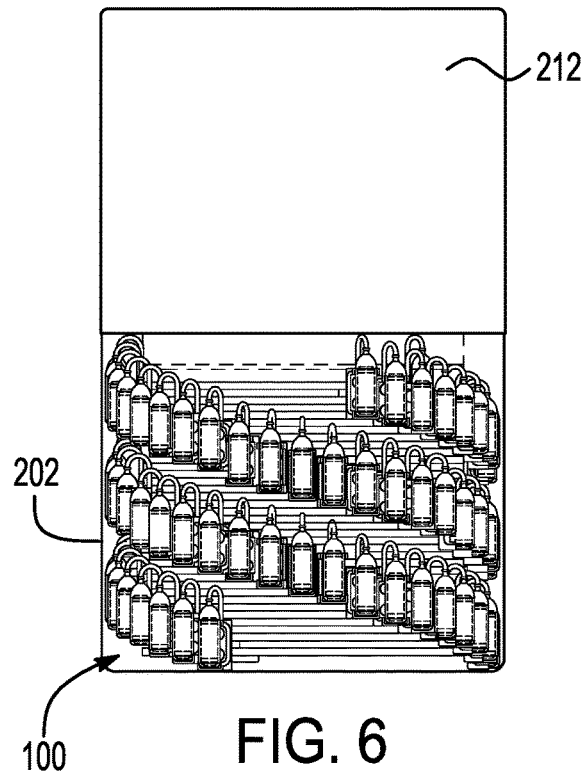
FIG. 6 is a side view of the deployment system of FIG. 5.

As an alternative to direct integration of the pack array 100 with a host vehicle or platform, the array 100 may be integrated into a standalone hydrophone unit 200, as shown in FIGS. 5 and 6. The standalone unit 200 may be launched, such as from an air vehicle or water vehicle, and may then deploy autonomously.

In the unit 200 the stacked array 100 is located in a cannister or can 202. A similar cannister or can may be part of the array 100 when integrated into a host vehicle or platform, as noted above. The cannister 202 may be made of aluminum or another suitable material. In FIGS. 5 and 6 the cannister 202 is shown as transparent for illustration purposes.

The cannister 202, as part of the unit 200, couples to an upper (float) assembly 212. The upper assembly 212 may include a float, a battery system for powering the sensors of the unit 200, and an upper electronics assembly. As described further below, an array leader and a lower electronics assembly may be releasable from the upper assembly 212 during the deployment process.

Figure 7:
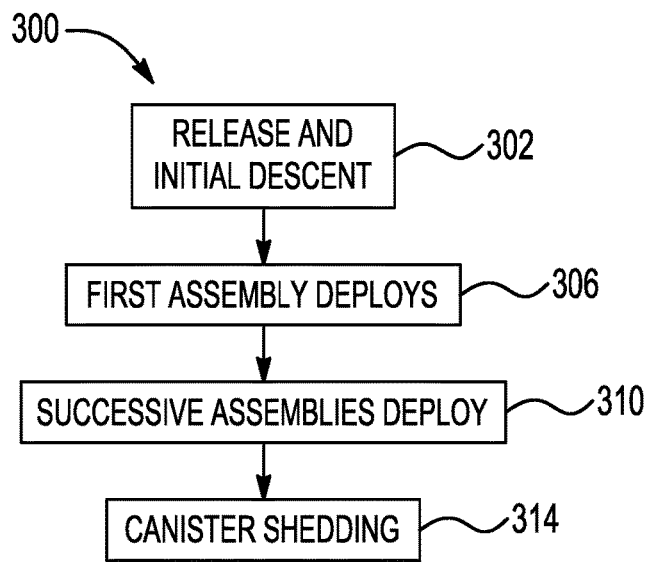
FIG. 7 is a high-level flow chart of a deployment method for the deployment system of FIG. 5, according to an embodiment.
Figure 9:
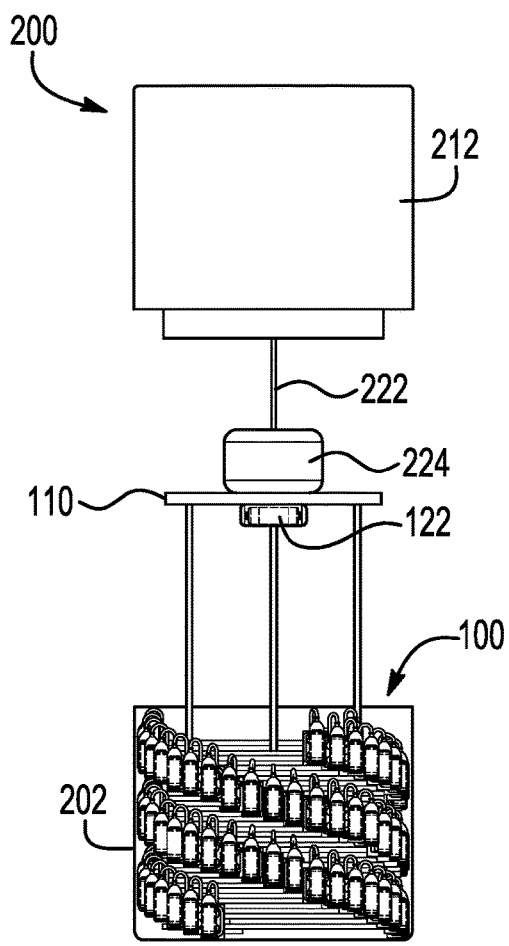
FIG. 9 is a side view of a deployment, according to a second step of the method of FIG. 7.
Figure 8:
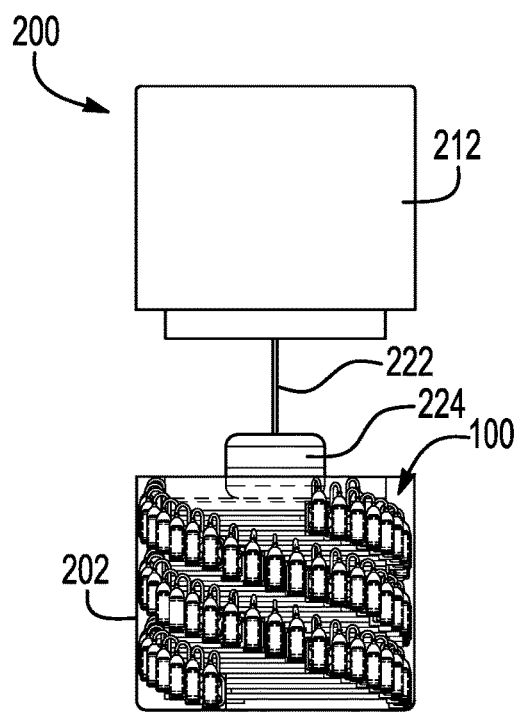
FIG. 8 is a side view of a deployment, according to a first step of the method of FIG. 7.
Figure 10:
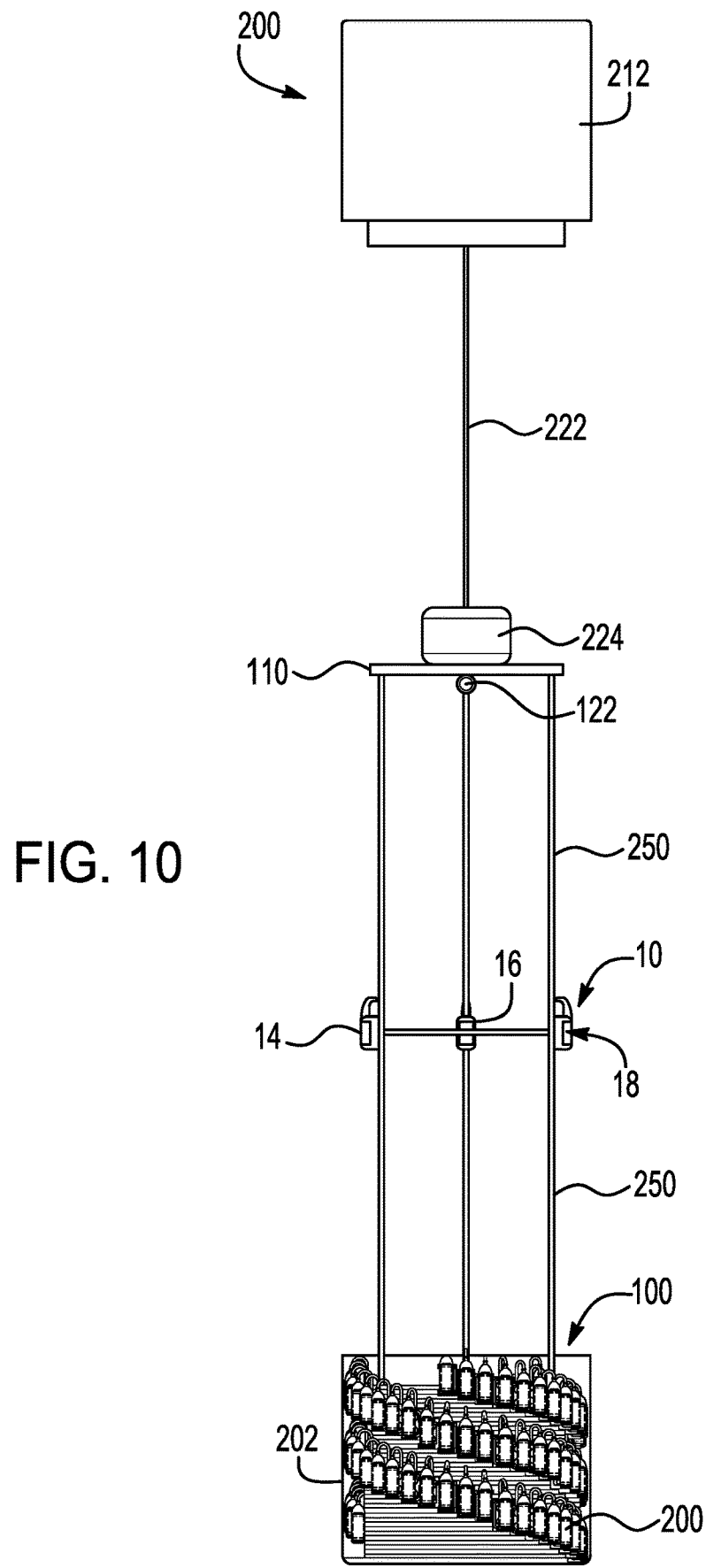
FIG. 10 is a side view of a deployment, according to a third step of the method of FIG. 7.

FIG. 7 shows a high-level flow chart of a method 300 for deployment of the unit 200. FIGS. 8-10 show steps in the deployment.

In step 302, illustrated in FIG. 8, array pack 100 descends from the upper float assembly 212. At this point, and until the end of the deployment process, the array 100 remains in the cannister 202. The descent of the array pack 100 (and the cannister 202) may be due to gravity, while the upper assembly 212 remains in place due to buoyancy, being at or near a water surface. The initial descent may involve paying out of an array leader 222 from a top of the descending combination of the array pack 100 and the cannister 202. The array leader 222 may be initially stored in the cannister 202, and is coupled to a lower electronics unit 224 that initially descends along with the array pack 100 and the cannister 202.

The lower electronics unit 224 may include a release mechanism that initially releases the cannister 202 from the upper float assembly 212. Any of a variety of suitable mechanical release mechanisms may be used. The release may be automatic, or may be triggered by any of a variety of events, including selectively by remote communication.

The lower electronics unit (LEU) 224 may also include hardware and/or software, such as node cards, for recording, consolidating, manipulating, and/or interpreting data from the acoustic and non-acoustic sensors. A transmitter, for transmitting signals such as data or data-based signals, may also be part of the lower electronics unit 224.

As illustrated in FIG. 9, after the array leader 222 has paid out, in step 306 the LEU 224 and the uppermost NAS assembly 110 are pulled out of the descending cannister 200. This begins the process of deploying the assemblies of the array 100.

Thereafter, in step 310, successive of the NAS assemblies 110 and ring assemblies (nodes) 10 are pulled out from the cannister 202. Cables 250 between adjacent assemblies are paid out, and the top remaining assembly in the cannister 202 is then pulled out of the cannister. The vertical distance between adjacent of the assemblies may be about 6 m (20 feet) when the assemblies are deployed. More broadly, the vertical distance may be at least 3 m (10 feet). These distances are non-limiting examples, and a wide variety of other distances may be used, depending on the circumstances.

Finally, in step 314, after the array 100 bottoms out, the cannister 202 sheds from the bottom of the array 100 (which may include a terminal weight). This helps reduce drag on the deployed array 100 from cross flow.

The resulting deployed array is a vertical array of nodes, such as triplet ring assemblies, that form a cylindrical volumetric array in a water column. Triplet ring assemblies each allow for formation of a carotid that enables the vertical array to gather both bearing and range of low-frequency, low-sound-level sources without the need for a secondary horizontal array.

Further, the triplet configuration allows for beam steering in vertical and horizontal planes. This permits the beam null to be aimed at sources of acoustic interference, providing processing gain during prosecution of very quiet sources in potentially noisy environments.

In addition, the deployment of non-acoustic sensors intermittently within the volumetric array can be useful. For example, it may provide feedback on the array shape in the presence of crossflow.

Systems such as those described herein may be easily reconfigured for different environments, or for different scenarios. They may therefore be deployed in multiple locations across varied environments.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A hydrophone assembly comprising:
an array pack including a plurality of ring assemblies operatively coupled together, each said ring assembly including a plurality of hydrophones attached to a ring and evenly spaced about and outside a circumference of the ring,
wherein the plurality of ring assembles are stored in a nested configuration in which adjacent ring assemblies are circumferentially offset to each other such that the rings of adjacent ring assemblies are stacked in contact and the hydrophones radially overlap the rings of adjacent ring assemblies.

2. The hydrophone assembly of claim 1, wherein the ring includes ring segments that separate brackets that receive the hydrophones.

3. The hydrophone assembly of claim 2, wherein the ring segments define gaps therebetween for receiving cables of the assembly that are coupled to respective of the hydrophones.

4. The hydrophone assembly of claim 1, wherein the hydrophone assembly includes three hydrophones circumferentially spaced about the ring to form a triplet array.

5. The hydrophone assembly of claim 1, wherein cables extending between the ring assemblies are radially inward of rings of the ring assemblies when the ring assemblies are in the nested configuration.

6. The hydrophone assembly of claim 5, wherein the cables are in a flood region of the array when the ring assemblies are in the nested configuration, with the flood region defined by the rings of the ring assemblies.

7. The hydrophone assembly of claim 1, wherein the ring assemblies are stacked and circumferentially offset in a helical array.

8. The hydrophone assembly of claim 1, further comprising non-acoustic sensor assemblies between some adjacent pairs of the ring assemblies.

9. The hydrophone assembly of claim 8, wherein the non-acoustic sensor assemblies each include one or more non-acoustic sensors.

10. The hydrophone assembly of claim 1, wherein the ring assemblies are triplet ring assemblies, each with three hydrophones.

11. The hydrophone assembly of claim 1, wherein the ring assemblies are coupled together by cables.

12. The hydrophone assembly of claim 11, wherein the cables are at least 3 m (10 ft) in length, with the ring assemblies separated by at least 3 m (10 ft) when deployed.

13. The hydrophone assembly of claim 1, further comprising a canister that the array pack is in prior to and partially during deployment.

14. The hydrophone assembly of claim 1, wherein hydrophones in a plurality of the ring assemblies overlap multiple stacked rings to either side of the plurality of ring assemblies.

15. The hydrophone assembly of claim 1, wherein the adjacent ring assemblies radially overlap without interference between the hydrophones of adjacent ring assemblies due to the circumferential offset.

16. The hydrophone assembly of claim 1, where each hydrophone extends above and below the ring to which it is attached.

17. A hydrophone array pack unit comprising:
an upper assembly;
a cannister releasably mechanically coupled to the upper assembly; and
an array pack in the cannister, said array pack including a plurality of ring assemblies operatively coupled together, each said ring assembly including a plurality of hydrophones attached to a ring and evenly spaced about and outside a circumference of the ring,
wherein the plurality of ring assembles are stored in a nested configuration in which adjacent ring assemblies are circumferentially offset to each other such that the rings of adjacent ring assemblies are stacked in contact and the hydrophones radially overlap the rings of adjacent ring assemblies,
wherein the nested ring assemblies are capable of deploying by separating vertically.

18. The array pack of claim 17, wherein the upper assembly is a float assembly capable of flotation in water.

19. The array pack of claim 18, wherein the cannister and the array pack are heavier than water, and separate from the upper assembly when a mechanical coupling between the upper assembly and the cannister is released.

20. A method of deploying a hydrophone array, the method comprising:
mechanically releasing from a float assembly a cannister that contains an array pack of ring assemblies that each include a ring, and multiple hydrophones attached to the ring, circumferentially spaced around and outside of the ring, wherein the plurality of ring assembles are stored in a nested configuration in which adjacent ring assemblies are circumferentially offset to each other such that the rings of adjacent ring assemblies are stacked in contact and the hydrophones radially overlap the rings of adjacent ring assemblies; and
deploying the ring assemblies from the cannister as the cannister moves away from the float assembly, with the ring assemblies remaining tethered to each other and to the float assembly during the deploying.

\* \* \* \* \*

UNITED STATES PATENT AND TRADEMARK OFFICE
CERTIFICATE OF CORRECTION

| | | |
|---|---|---|
| PATENT NO. | : 12,105,235 B2 | Page 1 of 1 |
| APPLICATION NO. | : 17/812541 | |
| DATED | : October 1, 2024 | |
| INVENTOR(S) | : Misulia et al. | |

It is certified that error appears in the above-identified patent and that said Letters Patent is hereby corrected as shown below:

On the Title Page

Item (71), in "Applicant", in Column 1, Line 1, delete "Waltham," and insert --Tewksbury,-- therefor In the Specification In Column 7, Line 32, delete "200." and insert --202.-- therefor Signed and Sealed this
Thirteenth Day of January, 2026

John A. Squires
*Director of the United States Patent and Trademark Office*